Sept. 28, 1954  J. S. BUCKWALTER  2,690,363
DISTRIBUTOR PLATE BEARING ASSEMBLY
Filed April 24, 1952
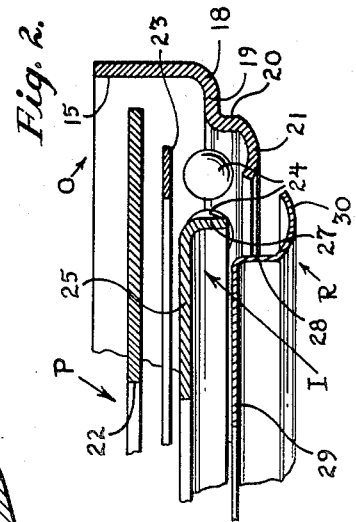
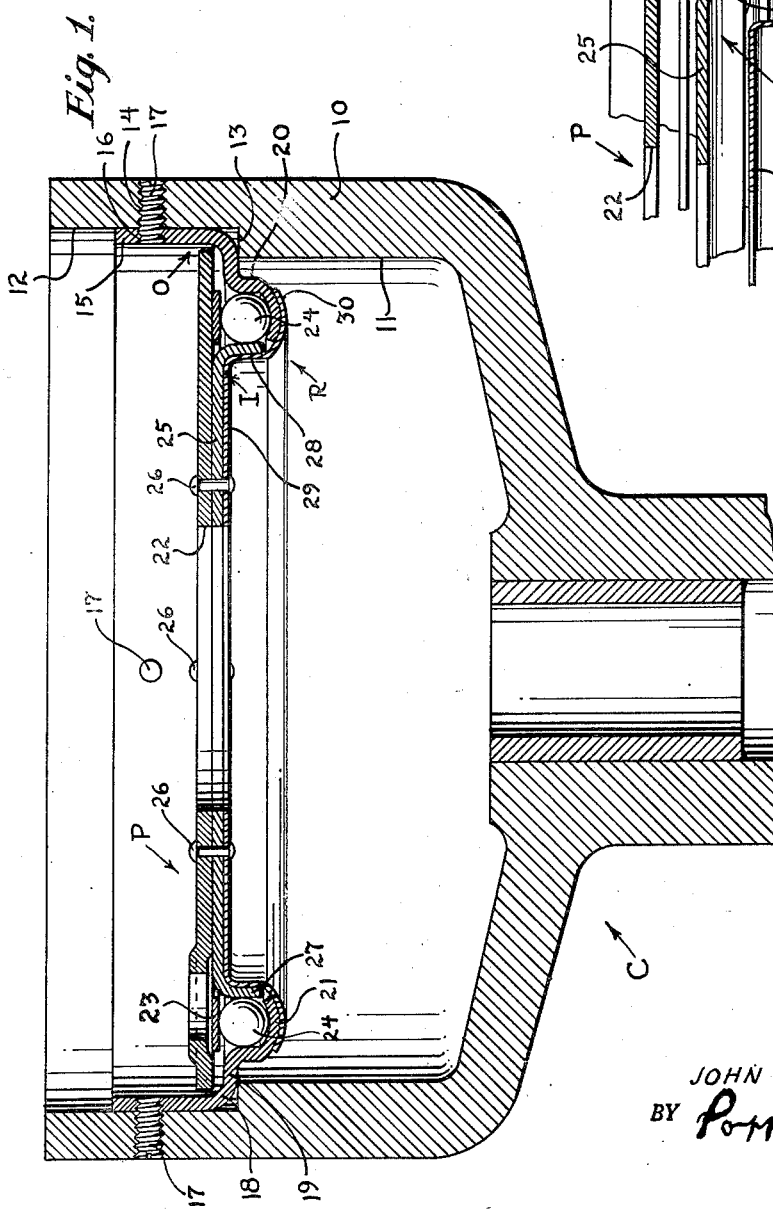
INVENTOR.
JOHN S. BUCKWALTER
BY Popps and Brune
HIS ATTORNEYS.

Patented Sept. 28, 1954

2,690,363

UNITED STATES PATENT OFFICE 2,690,363

DISTRIBUTOR PLATE BEARING ASSEMBLY

John S. Buckwalter, Lancaster, Pa.

Application April 24, 1952, Serial No. 284,077

6 Claims. (Cl. 308—227)

1

The present invention relates to distributors and is concerned primarily with the bearing assembly that provides for the rotatable mounting of the plate within the distributor casing.

In accordance with present day design, a distributor ordinarily includes a casing having a cylindrical wall. The distributor plate is rotatably mounted within this wall and coaxially therewith. The present invention has in view as its foremost objective the provision of a new, improved, and highly simplified bearing assembly for so mounting the distributor plate.

Another object of the invention is to provide, in a distributor of the type noted, a bearing assembly which includes a race which consists essentially of two complemental elements which are maintained in assembled relation by a retaining ring.

More in detail the invention has as an objective the provision of a bearing assembly for distributor plate which includes a race ring having a cylindrical flange that is secured to the cylindrical wall of the casing. This ring provides what might be called the outer and lower walls of the bearing race. The distributor plate itself constitutes the upper wall of the ring while an inner race ring is secured to the underface of the bearing assembly and has a cylindrical flange which provides the inner wall of the race.

Still another objective of the invention is to provide, in a bearing assembly for distributor plates, a highly simplified arrangement for maintaining the race ring and plate in assembled relation. This means preferably takes the form of a retaining ring having a cylindrical wall which engages the cylindrical flange of the race ring carried by the distributor ring with a pressed fit. This retaining ring has an outwardly extending flange which engages the bottom wall of the race, that is formed as a part of the outer race ring.

Various other more detailed objects and advantages of the invention, such as arise in connection with carrying out the above noted ideas in a practical embodiment, will in part become apparent and in part be hereinafter stated, as the description of the invention proceeds.

The invention, therefore, comprises a bearing assembly for distributor plates which consists essentially of an outer race ring having a cylindrical flange that is secured to the cylindrical wall of the distributor casing. This outer race ring presents the outer and lower race walls. The distributor plate itself extends over the lower

2 race wall to provide the upper race wall, and an inner race ring is secured to the underface of the distributor plate. This inner race ring has a cylindrical flange which provides the inner race wall. A retaining ring is secured within this cylindrical flange of the inner race ring by a pressed fit and has an outwardly extending flange that engages the lower race wall.

For a full and more complete understanding of the invention, reference may be had to the following description and accompanying drawing wherein:

Figure 1 is an axial section taken through a distributor casing with the plate rotatably mounted therein by the bearing race assembly of this invention and Figure 2 is a detailed perspective fragmentary view developing the several elements of the race assembly in exploded relation.

Referring now to the drawing wherein like reference characters denote corresponding parts, a distributor casing is therein illustrated and referred to in its entirety by the reference character C. The casing C includes a cylindrical wall 10 having a bore 11 which is enlarged as indicated at 12 with a shoulder 13 connecting the bore 11 to the enlarged bore 12. Above the shoulder 13, the wall 10 is provided with a plurality of threaded passages 14 for a purpose to be later described.

The bearing assembly of the present invention includes an outer race ring which is referred to in its entirety by the reference character O. The ring O includes a cylindrical flange 15 which is snugly received within the enlarged bore 12 and which is formed with a plurality of threaded openings 16 that align with the threaded passage 14. Screw fasteners 17 pass through these aligned passages and openings and securely anchor the ring O in position within the wall 10 of the casing C.

Integrally joined to the cylindrical flange 16 by a curve or bend as depicted at 18 is an inwardly extending horizontal wall 19. Extending downwardly from the inner edge of this horizontal wall 19, to which it is integrally joined, is a vertical wall 20 which constitutes the outer wall of the race. Integrally joined to the lower edge of this vertical wall 20 is a bottom wall 21 that is of a curved trough-like formation. This wall 21 constitutes the lower or bottom wall of the race.

A distributor plate is referred to in its entirety by the reference character P. The plate P is of the ring-like formation which is defined by the central opening 22. This plate P extends over the bottom wall 21 and a washer 23 may be interposed between the ball bearing elements 24 which are confined in the race and the underface of the distributor plate.

An inner race ring is referred to in its entirety by the reference character I. The ring I comprises a flat horizontal wall 25 which is secured to the underface of the plate P in any preferred manner such as by the rivets shown at 26. Extending downwardly from the outer edge of the wall 25 to which it is integrally joined is a cylindrical flange 27 which constitutes the inner wall of the race. It will be noted that the lower free edge of this wall 27 is spaced a slight distance from the inner edge of the bottom race wall 21.

A retaining ring is identified in its entirety by the reference character R. It comprises a cylindrical wall 28 that engages the inner face of the cylindrical wall 27 of the inner race ring I with a pressed fit. At the upper edge of this cylindrical wall 28, there is an inwardly extending flange 29 which bears against the lower face of the wall 25. At the lower edge, there is an outwardly extending flange 30 which engages the lower face of the bottom wall 21. It is evident that this retaining ring R maintains the assembled relation of the several walls which define the bearing race.

It will be understood that the distributor will be mounted in an upright position that is, the axis of the cylindrical wall 10 will be disposed vertically. In this position, the outer race ring O is fixedly secured to the wall 10 by the screws 17. Moreover, the inner race ring I is fixedly secured to the plate P and the retaining ring R is secured to the cylindrical wall 27 of the inner race ring I. In operative position, the outwardly extending flange 30 of the retaining ring R will actually be slightly spaced from the lower outer face of the wall 21 so as not to create any appreciable amount of friction which would interfere with the rotation of the plate P. This condition is achieved by properly dimensioned parts coupled with gravity action which would normally cause the plate P and parts carried thereby to move downwardly as far as possible.

While a preferred specific embodiment of the invention is hereinbefore set forth, it is to be clearly understood that the invention is not to be limited to the exact constructions, mechanisms, and devices illustrated and described, because various modifications of these details may be provided in putting the invention into practice within the purview of the appended claims.

What is claimed is:

1. In a bearing race assembly for a distributor including a casing having a cylindrical wall and a ring-like plate that is to be rotatably mounted therein, an outer race ring having a cylindrical wall defining the outer wall of the race and a bottom wall defining the bottom wall of the race, means for securing said outer race ring to said casing wall, said plate including an outer marginal portion extending over said bottom wall, an inner race ring secured to the underface of said plate and having a cylindrical wall defining the inner wall of the race, and means for maintaining the assembled relation of said plate and inner race ring carried thereby with respect to said outer race ring.

2. In a bearing race assembly for a distributor including a casing having a cylindrical wall and a ring-like plate that is to be rotatably mounted therein, an outer race ring having a cylindrical wall defining the outer wall of the race and a bottom wall defining the bottom wall of the race, means for securing said outer race ring to said casing wall, said plate including an outer marginal portion extending over said bottom wall, an inner race ring secured to the underface of said plate and having a cylindrical wall defining the inner wall of the race, and a retaining ring fitted within the cylindrical wall of said inner race ring and having an outwardly extending flange disposed beneath said bottom wall.

3. In a bearing race assembly for a distributor including a casing having a cylindrical wall and a ring-like plate that is to be rotatably mounted therein, an outer race ring having a cylindrical flange snugly received within the bore of said casing wall and fixedly secured thereto, an inwardly extending horizontal wall, a downwardly extending vertical wall constituting the outer wall of the race, and an inwardly extending bottom wall constituting the bottom wall of the race; said distributor plate having an outer marginal portion extending over said bottom wall; an inner race ring having a flat wall secured to the underface of said plate and a downwardly extending cylindrical wall constituting the inner wall of the race; and means carried by said distributor plate for maintaining said plate and inner race carried thereby in assembled relation with respect to said outer race ring.

4. In a bearing race assembly for a distributor including a casing having a cylindrical wall and a ring-like plate that is to be rotatably mounted therein, an outer race ring having a cylindrical flange snugly received within the bore of said casing wall and fixedly secured thereto, an inwardly extending horizontal wall, a downwardly extending vertical wall constituting the outer wall of the race, and an inwardly extending bottom wall constituting the bottom wall of the race; said distributor plate having an outer marginal portion extending over said bottom wall; an inner race ring having a flat wall secured to the underface of said plate and a downwardly extending cylindrical wall constituting the inner wall of the race; means carried by said distributor plate for maintaining said plate and inner race carried thereby in assembled relation with respect to said outer race ring, ball bearing elements racing on said bottom wall and confined between the cylindrical walls of said outer and inner race rings, and a washer interposed between said bearing elements and the underface of said plate.

5. In combination, a distributor having a casing including a cylindrical wall having a bore that is enlarged at its outer end, there being a shoulder between said bore and the enlarged portion thereof, said wall being formed with a plurality of threaded passages where said bore is enlarged; an outer casing ring comprising a cylindrical flange snugly received within said enlarged bore and formed with a plurality of threaded openings in alignment with said threaded passages, an inwardly extending horizontal wall integrally joined to the lower edge of said flange and resting on said shoulder, a downwardly extending cylindrical wall integrally joined to the inner edge of said horizontal wall, and an inwardly extending curved bottom wall integrally joined to the said cylindrical wall; screw fasteners in said aligned passages and openings; a distributor plate having an outer marginal portion extending over the horizontal and bottom walls of said outer race ring; an inner race ring comprising a flat wall secured to the underface of said plate and a downwardly extending cylindrical wall integrally joined to the outer edge of said flat wall and spaced from the cylindrical wall of said outer race ring; and means for maintaining said plate and inner race ring carried thereby in spaced relation with respect to said outer race ring.

6. In combination, a distributor having a casing including a cylindrical wall having a bore that is enlarged at its outer end, there being a shoulder between said bore and the enlarged portion thereof, said wall being formed with a plurality of threaded passages where said bore is enlarged; an outer casing ring comprising a cylindrical flange snugly received within said enlarged bore and formed with a plurality of threaded openings in alignment with said threaded passages, an inwardly extending horizontal wall integrally joined to the lower edge of said flange and resting on said shoulder, a downwardly extending cylindrical wall integrally joined to the inner edge of said horizontal wall, and an inwardly extending curved bottom wall integrally joined to the said cylindrical wall; screw fasteners in said aligned passages and openings; a distributor plate having an outer marginal portion extending over the horizontal and bottom walls of said outer race ring; an inner race ring comprising a flat wall secured to the underface of said plate and a downwardly extending cylindrical wall integrally joined to the outer edge of said flat wall and spaced from the cylindrical wall of said outer race ring; a retaining ring having a cylindrical wall engaging the cylindrical wall of said inner race ring with a pressed fit and an outwardly extending flange beneath the bottom wall of said outer ring; ball bearing elements on said bottom wall and confined between the cylindrical walls of said inner and outer race rings; and a washer interposed between said bearing elements on the underface of said plates.

References Cited in the file of this patent

UNITED STATES PATENTS

| Number | Name | Date |
|---|---|---|
| 2,296,652 | Ray | Sept. 22, 1942 |

FOREIGN PATENTS

| Number | Country | Date |
|---|---|---|
| 596,496 | Great Britain | Jan. 6, 1948 |